United States Patent
Rudrabhatla et al.

(10) Patent No.: US 11,922,047 B2
(45) Date of Patent: Mar. 5, 2024

(54) USING RPO AS AN OPTIMIZATION TARGET FOR DATADOMAIN GARBAGE COLLECTION

(71) Applicant: EMC IP Holding Company LLC, Hopkinton, MA (US)

(72) Inventors: Anand Rudrabhatla, Pleasanton, CA (US); Jehuda Shemer, Kfar Saba (IL); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 17/447,899

(22) Filed: Sep. 16, 2021

(65) Prior Publication Data

US 2023/0081590 A1 Mar. 16, 2023

(51) Int. Cl.
*G06F 3/06* (2006.01)

(52) U.S. Cl.
CPC .......... *G06F 3/0652* (2013.01); *G06F 3/0608* (2013.01); *G06F 3/0644* (2013.01); *G06F 3/0647* (2013.01); *G06F 3/0673* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 7,610,437 B2* | 10/2009 | Sinclair | ................. | G06F 3/0652 711/104 |
| 7,984,084 B2* | 7/2011 | Sinclair | ............... | G06F 16/1847 707/818 |
| 8,285,918 B2* | 10/2012 | Maheshwari | ........ | G11C 7/1072 711/159 |
| 8,429,359 B1* | 4/2013 | Desai | .................. | G06F 11/1461 711/E12.103 |
| 8,443,263 B2* | 5/2013 | Selinger | .............. | G06F 11/1068 714/768 |
| 8,538,919 B1* | 9/2013 | Nielsen | ............... | H04L 63/0272 718/1 |
| 8,593,678 B2* | 11/2013 | Ohishi | ................. | H04N 1/2166 358/1.15 |

(Continued)

FOREIGN PATENT DOCUMENTS

| | | | | |
|---|---|---|---|---|
| AU | 2011329232 A1 | * | 6/2013 | .......... G06F 11/1453 |
| CN | 112925669 A | * | 6/2021 | ............ G06F 11/076 |

(Continued)

OTHER PUBLICATIONS

Anonymous, "migration", Oct. 22, 2020, pp. 1-3, https://web.archive.org/web/20201022130751/https://www.pcmag.com/encyclopedia/term/migration (Year: 2020).*

*Primary Examiner* — Christopher D Birkhimer
(74) *Attorney, Agent, or Firm* — Workman Nydegger

(57) ABSTRACT

One example method includes ingesting data to a data protection system, separating, by the data protection system, the ingested data into groups according to Recovery Point Objective (RPO) such that each group is associated with a different respective RPO, storing the groups in respective storage pools, and each of the storage pools is associated with a respective one of the RPOs, and performing a respective garbage collection (GC) process at each storage pool.

20 Claims, 3 Drawing Sheets

(56) References Cited

U.S. PATENT DOCUMENTS

| | | | |
|---|---|---|---|
| 8,873,284 B2* | 10/2014 | Sinclair | G06F 12/0246 365/185.11 |
| 9,075,705 B2* | 7/2015 | Hikichi | G06F 11/004 |
| 9,092,182 B2* | 7/2015 | Ohishi | H04N 1/00944 |
| 9,223,693 B2* | 12/2015 | Sinclair | G06F 12/0246 |
| 9,336,133 B2* | 5/2016 | Sinclair | G06F 12/0246 |
| 9,344,596 B2* | 5/2016 | Ohishi | H04N 1/00973 |
| 9,348,746 B2* | 5/2016 | Sinclair | G06F 12/0246 |
| 9,465,731 B2* | 10/2016 | Sinclair | G06F 12/0246 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,800,291 B1* | 10/2017 | Ben David | G06F 11/1415 |
| 10,108,543 B1* | 10/2018 | Duggal | G06F 3/0619 |
| 10,108,544 B1* | 10/2018 | Duggal | G06F 16/1748 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,430,279 B1* | 10/2019 | Dittia | G06F 3/0656 |
| 10,795,812 B1* | 10/2020 | Duggal | G06F 3/067 |
| 10,983,715 B2* | 4/2021 | Sharoni | G06Q 20/105 |
| 11,086,537 B2* | 8/2021 | Byun | G06F 3/0679 |
| 2004/0117414 A1* | 6/2004 | Braun | G06F 8/65 |
| 2006/0005074 A1* | 1/2006 | Yanai | H04L 67/1095 714/6.32 |
| 2007/0033325 A1* | 2/2007 | Sinclair | G06F 3/0608 711/170 |
| 2008/0082596 A1* | 4/2008 | Gorobets | G06F 12/0253 |
| 2008/0140902 A1* | 6/2008 | Townsend | H04B 1/0475 710/306 |
| 2008/0189477 A1* | 8/2008 | Asano | G06F 12/0246 711/E12.008 |
| 2008/0307020 A1* | 12/2008 | Ko | G06F 21/6245 |
| 2011/0145473 A1* | 6/2011 | Maheshwari | G06F 12/12 711/E12.008 |
| 2011/0161784 A1* | 6/2011 | Selinger | G06F 11/1016 714/E11.002 |
| 2011/0236049 A1* | 9/2011 | Haga | G03G 15/5004 399/75 |
| 2013/0024423 A1* | 1/2013 | Doshi | G06F 11/1448 707/640 |
| 2013/0173554 A1* | 7/2013 | Ubukata | G06F 11/2094 707/640 |
| 2014/0325148 A1* | 10/2014 | Choi | G06F 3/0659 711/114 |
| 2014/0365719 A1* | 12/2014 | Kuzmin | G06F 12/0246 711/103 |
| 2015/0227602 A1* | 8/2015 | Ramu | G06F 11/1456 707/634 |
| 2016/0246713 A1* | 8/2016 | Choi | G06F 3/0608 |
| 2017/0123655 A1* | 5/2017 | Sinclair | G06F 3/061 |
| 2017/0132082 A1* | 5/2017 | Resch | G06F 11/1076 |
| 2017/0262219 A1* | 9/2017 | Lin | G06F 3/064 |
| 2018/0189175 A1* | 7/2018 | Ji | G06F 3/0679 |
| 2020/0089420 A1* | 3/2020 | Sharoni | G06Q 20/354 |
| 2020/0226107 A1* | 7/2020 | Dixit | G06F 16/1752 |
| 2020/0310686 A1* | 10/2020 | Truong | G06F 3/061 |
| 2021/0034273 A1* | 2/2021 | Perneti | G06F 11/1461 |
| 2021/0042049 A1* | 2/2021 | Mulholland | G06F 3/067 |
| 2021/0133070 A1* | 5/2021 | Pletka | G06F 12/0246 |
| 2021/0133110 A1* | 5/2021 | Tomic | G06F 12/0882 |
| 2021/0247906 A1* | 8/2021 | Sun | G06F 12/1009 |
| 2021/0342362 A1* | 11/2021 | Haravu | G06F 11/1464 |

FOREIGN PATENT DOCUMENTS

| | | | | |
|---|---|---|---|---|
| WO | WO-2013019869 A2 | * | 2/2013 | G06F 11/1453 |
| WO | WO-2016100790 A1 | * | 6/2016 | G06F 11/1451 |

* cited by examiner

USING RPO AS AN OPTIMIZATION TARGET FOR DATADOMAIN GARBAGE COLLECTION

FIELD OF THE INVENTION

Embodiments of the present invention generally relate to garbage collection in data protection systems. More particularly, at least some embodiments of the invention relate to systems, hardware, software, computer-readable media, and methods for using RPO (Recovery Point Objective) as an optimization target to drive the performance of a garbage collection process.

BACKGROUND

Garbage Collection (GC) processes are used in various computing environments to reclaim dead space from the system storage. In general, GC works by identifying live objects, reclaiming memory by removing dead objects, and coalesces free space, that is, performs a compaction process, by relocating live objects. Such processes may proceed on an assumption that live and dead objects are Mutually Exclusive and Collectively Exhaustive (MECE).

With each run, the GC process reclaims most of the dead space for reuse. The GC process consumes system resources such as CPU and memory to determine live/dead status for each object/segment and stores live/dead information in memory for performance. The more the storage capacity of the underlying data protection system, the longer it takes for the GC process to complete. The system resources, such as CPU and memory, consumed are directly proportional to both the frequency of the GC process runs and the underlying storage capacity. Since the system resources on in a data protection environment may be are shared, it can be important to efficiently manage the frequency of the GC runs.

One concern with current GC approaches is that they can negatively impact the system RPO. This concern is particularly acute in view of the fact that backup RPO targets are trending into the 15 min area, and the ability to meet these targets may be impaired by GC processes. Until now, snapshotting technology and other constraints have limited reaching these targets. In light of stunless backup enabling the practical reduction of cadence into the 15-minute RPO area, the remaining concern is the GC cycle time.

Particularly, the lower the RPO, the more garbage collection is needed. This is because less frequent backups tend to accumulate the changes as the same blocks can get modified again and again. If the backups are more frequent, as new backups come in, older backups go out, that is, reach the end of their retention period. Any non-dedup areas, that is, blocks that are unique to that backup, need to be cleaned up when the backup is deleted. The common areas, that is, those chunks that are common, stay in the system as they are referenced by other backups. So the problem is the leftovers and not the shared blocks. Further, the more frequent the backup, the more garbage is generated on the backup appliance. The more garbage collected, the more resources that are expended on GC, and the fewer resources available to actually handle the intensity of incoming backups at this low RPO.

Thus, the GC is resource intensive and requires managing a tradeoff. On the one hand, if GC is not run often enough, unused segments will not be released, and the storage capacity will fill up with unused and unneeded segments, consuming space that could otherwise be used by live segments and objects. On the other hand, if GC is run too frequently, data backup appliance resources will be tied up moving data for GC instead of performing other functions. These problems are complicated further by the drive toward ever lower RPOs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
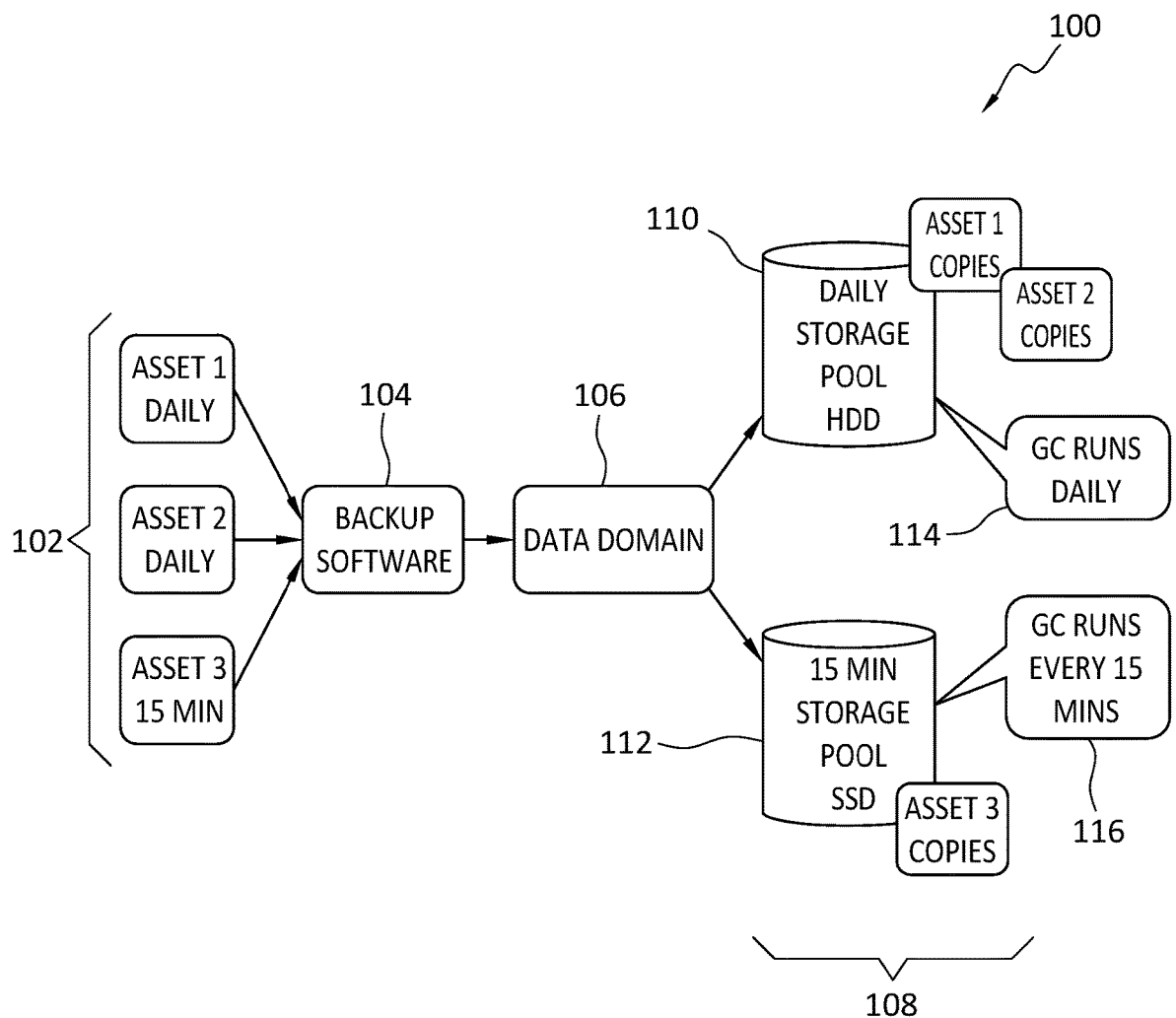
FIG. 1 discloses aspects of an example architecture according to some embodiments of the invention.

Embodiments of the present invention generally relate to garbage collection in data protection systems. More particularly, at least some embodiments of the invention relate to systems, hardware, software, computer-readable media, and methods for using RPO (Recovery Point Objective) as an optimization target to drive the performance of a garbage collection process.

Example embodiments of the invention may operate to made a data protection system aware of data protection asset RPOs, and automatically group the assets in storage pools in performance-based brackets per RPO to optimize GC (garbage collection) operations while still meeting RPO targets. Some example embodiments may be implemented in the DellEMC DataDomain data protection environment, but that is not required. More generally, embodiments may be employed in any environment where GC impacts, or may, achievement of RPOs.

In general, example embodiments of the invention may utilize separate storage pools, differentiated from each other by their respective RPO. The backup system may make the data protection system aware of the RPO, and storage pools may be automatically be selected accordingly. This scheme may reduce the overall GC resource usage, since the GC may be run on a reduced subset of data according to the storage pool backup cadence, and embodiments may thus optimize GC on a per RPO target basis.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that embodiments may improve the ability of data protection systems to meet an RPO such as may be specified in a SLA (Service Level Agreement). An embodiment may reduce the amount of resources, such as CPU time, memory, and storage, consumed by a GC process. An embodiment may improve the efficiency and/or effectiveness of a data backup process. Various other advantages of some example embodiments will be apparent from this disclosure.

It is noted that nothing herein should be construed as teaching or suggesting that any aspect of any embodiment of the invention could or would be performed, practically or otherwise, in the mind of a human. Further, and unless explicitly indicated otherwise, the disclosed methods, processes, and operations, are contemplated as being implemented by computing systems that may comprise hardware and/or software. That is, such methods, processes, and operations, are defined as being computer-implemented.

A. Overview

A mark and sweep GC process may include two phases, namely, a mark phase and a sweep phase. The time of the mark phase may be proportional to the amount of metadata in a data protection system. In the mark phase, the GC process may walk the namespace and the file metadata to mark all reachable live data segments. Some challenges can arise when attempting to support low RPOs, such as about 15 minutes in some cases, in a mark phase. For example, if the namespace is the same, it would be necessary to walk the entire namespace in order to clean 15 minute RPO backups, which would require running a GC process at higher frequency, and finishing the GC relatively quickly. Similarly, if file metadata for 15 minute RPO backups is mixed up with metadata for the rest of the backups, which may have less stringent RPOs, the system might end up reading all metadata even though there may only be interest in cleaning file metadata for the 15 minute RPO backup.

The sweep phase of a GC process may take an amount of time that is proportional to the amount of dead data in the system. In the sweep phase, the GC may walk the containers and copy live data from these containers into new containers. The problem of supporting 15 min backups is the same as in the mark phase. That is, even though the focus may be placed on cleaning dead data only for 15 min backups, other data will be read also, thus slowing the GC process and threatening the RPO. Both mark and sweep problems become worse as the GC process copies data and metadata forward into new containers, and the data and metadata are further mixed.

Fundamentally, the problem of supporting backups with different respective RPOs for GC is that if data of the backups get mixed up together, the GC process may end up reading/writing more data, even though the focus may be on cleaning only the data for a particular RPO. The problem gets worse as the GC process copies data forward and there is more mixing of data with different respective RPOs.

B. Aspects of Some Example Embodiments

Example embodiments may be employed in connection with backups of client, or asset, data. The backed up data may, or may not, have been created and/or modified by the asset.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B.1 Example Architecture for Some Embodiments

With reference now to FIG. 1, an example architecture 100 according to some embodiments is disclosed. The example architecture 100, which may comprise, or consist of, a data protection system, may include various assets 102 whose data is protected by a backup process performed by and/or at the direction of backup software 104 that creates backups which may then be provided to a data protection platform 106, one example of which is the DellEMC DataDomain platform.

Note that an asset 102 may comprise hardware and/or software. An asset 102 may comprise a single hardware storage device, or multiple hardware storage devices. In some cases, an asset 102 may comprise a client computing device or group of computing devices. More generally, an asset 102 may comprise any system, component, or device, whether implemented as hardware and/or software, that is operable to create, modify, and/or store, data.

As shown, each asset 102 may be backed up on a different schedule according to respective RPOs associated with those assets 102. Thus, Asset1 may be backed up daily, Asset2 may be backed up daily, and Asset3 may be backed up every 15 minutes. Thus, the respective RPOs for the assets 102 may be daily, daily, and 15 minutes. These assets 102 and associated RPOs are provided only by way of example, and are not intended to limit the scope of the invention in any way.

The RPO information for the assets 102 may be provided to the data protection platform 106 by the assets 102 themselves and/or by the backup software 104. In some cases, the RPO information for the assets 102 may be provided to the data protection platform 106 by the assets 102 themselves and/or by an administrator.

Using the RPO information, the data protection platform 106 may direct the backups received from the backup software 104 to respective storage pools 108 according to the RPO respectively associated with the backups. That is, storage pools 108 may be designated to hold backups that are all associated with the same, or similar, RPO. Thus, the example storage pools 108 may comprise a daily storage pool 110 which holds backups of Asset1 and Asset2, and a 15 minute storage pool 112 that holds backups of Asset3. In this way, backup data and metadata is isolated according to the RPO associated with particular data and metadata. The GC processes for the elements of the storage pool 108 may be implemented according to RPO. Thus, a GC process 114 may be run daily on the backups in the daily storage pool 110, and another GC process 116 may be run every 15 minutes on the backups in the 15 minute storage pool 112.

B.2 Example Operations of Some Embodiments

As indicated by FIG. 1 then, an example method may initially involve making a data protection platform aware of the asset backup cadence, that is, the frequency with which the asset data is backed up. Then, one or more storage pools may be created that may be targeted for specific cadences, such as, for example, 15 minutes, 1 hour, or 24 hours. After the storage pools have been created, the asset copies may be stored in the storage pool that corresponds to the respective cadences of the assets. Finally, a GC process, or GC processes, may be run on each storage pool according to the cadence to which that storage pool corresponds.

In further detail, as a relatively smaller proportion of assets reside in the higher tiers, that is, tiers with a lower cadence, than the lower tiers, that is, tiers with a relatively higher cadence, the higher frequency of GC runs will work on a smaller set of assets that take up a smaller portion of storage. The GC run time may be proportional to the amount of storage taken up so the higher run frequency is traded down by a smaller storage size to process. This may help to keep the GC resources used under control. Thus, a GC may be run on a smaller data set at a relatively higher frequency, while another GC may be run on a relatively larger data set at a relatively lower frequency. There may be a practical limit to this approach however, and in some instances, it may be necessary to employ additional processing resources to handle the load imposed by the GC processes. Notwithstanding, embodiments may avoid a situation where a high cadence GC process is run on all the storage data, and such embodiments may, instead, run a high cadence GC process only on the subset of storage, or storage pool(s), that actually requires a high cadence.

In addition the RPO and GC rates do not have to match on a specific pool. For example, a 15 min pool may have the GC run every hour for example. That means that storage is not cleaned up as frequently as new data is coming in and thus garbage is accumulated. If there is spare storage to host this garbage, then the GC can be run less frequently saving CPU/memory at the expense of this extra storage. The farther the gap between incoming and GC rates, the more extra storage is needed, thus it may be desirable that these numbers match to the degree possible to avoid extra storage costs.

With regard to storage pool creation and selection, the storage pools may be assigned fixed cadences, or the cadence for a storage pool may be derived, for example, from the information provided by the backup software. For example, if there are no 15 minute assets but there are a number of 30 minute assets, a 30 minute pool may be created, and there may be no need to create a 15 minute pool.

Further, the storage pool cadence, that is, the cadence with which backups are written to a storage pool, may also influence the selection of backend storage type of the storage pool. For example, an SLA may be tagged to one or more specific storage types, such as NVMe (Non Volatile Memory express), SSD, HDD (Hard Disk Drive), or Object, and backups assigned to a storage type based on the cadence of the backup and the storage type. For example, backups of an asset with a 15 minute RPO may be stored in NVMe, while backups of another asset whose SLA specifies a relatively longer RPO, or cadence, may be stored in a storage type suited to the longer cadence, such as object storage for example.

It is noted that while the cadence, or RPO, of an asset may match storage pool cadence exactly in some cases, an exact match is not required in all cases. For example if a system includes 15 minute, 60 minute, and 24 hour, pools, an asset with a 30 min RPO may be placed in the 15 or 60 min pool. Placing an asset backup in the higher frequency 15 minute storage pool means that the storage pool has more data to process. Placing the asset backup in the lower frequency 60 minute pool means that more data will accumulate before the next GC process is run on the lower frequency pool. This is an example of a system tradeoff that may have to be made in some circumstances, although in some cases at least, using the lower frequency may be a better long-term option since, for example, the processing load is relatively lower in such a case. If there are enough 30 minute assets, an additional 30 minute storage pool may be created to better target the use case.

Pool selection may also take garbage collection into account. If placing assets which are 45 minute backups, in a 60 minute storage pool, makes a GC process unable to keep up with data ingestion into the data protection system, those assets may be migrated to a 30 minute storage pool so since the GC for 30 minute assets may be able to keep up with the churn as the 30 minute GC is running at a relatively higher frequency than the 60 minute GC.

In some instances, the RPO for an asset specified in an SLA, or dataset RPO, may change. Various approaches may be taken to deal with an RPO change. For example, the asset and its data may be migrated to a storage pool/media better suited to the new cadence/SLA, such as a storage pool/media better able, than the prior storage pool/media, to support the new cadence. As another example, the asset and its data may be migrated to a storage pool used for lower cadence assets. Thus, an RPO change may imply movement of an asset to a storage pool with a higher, or lower, cadence, depending on the circumstances Another approach that may be taken when an RPO changes is to keep old data in old storage, and new data in new storage. The older data may eventually be removed from a storage pool when a specified retention period for the older data expires.

As noted herein, one approach to RPO awareness implemented in some example embodiments is for the backup software to provide the asset RPO information to the data protection platform, such as on a per asset basis for example. However, in situations where backup software is not integrated with a data protection platform, such as the DellEMC DataDomain platform, an alternative approach may be taken.

For example, asset backups may be tracked, such as by way of statistics including source, ID, or exposure to naming convention, and the backup frequency then derived from the gathered statistics. Thus, new assets coming online, or into a storage pool, may initially be placed in a storage pool whose cadence may not match the cadence of the new asset, until the asset backup cadence is derived. To avoid performance penalties, assets may default to a daily cadence, and then once the correct cadence is established, the asset may then be migrated or handled as described herein.

As noted herein, the performance of GC processes may be closely related to a cadence or RPO associated with an asset whose data is the subject of a GC process. Various approaches may be implemented to optimize, or at least improve, the performance of a GC process relative to how the GC process would perform absent the use of such approaches.

For example, if separate respective tiers, that is storage pools, are created for different RPOs, this approach may ensure that there is no mixing of metadata and data from different respective RPOs in the same objects in object storage, or in the same blocks in block storage. That is, data/metadata of with one RPO may not be mixed with data/metadata that have a different RPO. Thus, when a GC process copies forward objects/blocks, such as to new containers for example, the GC process may still keep data and metadata for different respective RPOs in different objects/blocks in the new containers. This approach may help to ensure that the GC time for a particular RPO data is proportional to the size of data and metadata for that RPO only.

In some instances, assets may be migrated between different storage pools, and embodiments of the invention may provide for optimization, or at least improvement of, the migration of assets, relative to how the migration process would perform absent the use of such approaches. In particular, as an RPO for client backups is derived over time, or in case there is a change to the RPO of a particular client, the asset data, and metadata associated with that data, may be migrated from one tier to another. This migration may be amortized, so that the metadata and data are copied and/or moved, over a period of time, between tiers. Thus, embodiments may implement a migration engine between tiers which finds client data whose RPO does not match the tier in which that client data currently resides, and migrate that data, and associated metadata, to another tier to optimize GC cost. For example, if an RPO becomes longer, the data with that RPO may require less frequent GC operations, and the lower tempo of those GC operations may correspondingly result in a decrease in costs to process the data.

The speed at which migration may be performed, and the timing of a migration process, may vary from one migration process to another. Thus, migration can run at some particular frequency, such as once a month for example, and clients migrated around so that the client is mapped to its best match RPO tier. In some instances, an acceptable plus/minus RPO range of a storage pool may be established for an asset or dataset so that the migration engine is not constantly moving data/metadata as the SLA RPO changes. For example, a migration engine rule may specify that for 60 minute RPO data, a storage pool with an associated RPO as high as 70 minutes is acceptable, such that the data/metadata would not be migrated off that storage pool unless the RPO for that storage pool is changed, for some reason, to exceed 70 minutes.

C. Further Discussion

As apparent from this disclosure, example embodiments may implement various features and advantages. For example, an embodiment may operate to make a data storage platform aware of the RPO of a data set stored, or to be stored, by the data storage platform. As another example, asset backups may be automatically directed to storage pools according to respective RPOs associated with those asset backups, and GC processes performed, at each storage pool, according to the respective RPOs assigned to those storage pools. Further, some embodiments may provide for the separation of metadata/data, based on RPO, and storing the separated data/metadata in storage pools according to respective RPOs of the data/metadata, so as to improve the efficiency of GC processes relative to how the GC processes would be performed absent such a separation and storage process. As a final example, embodiments may provide for migrating data/metadata across storage tiers, or storage pools, to keep up with the churn rate of a particular RPO.

D. Example Methods

Figure 2:
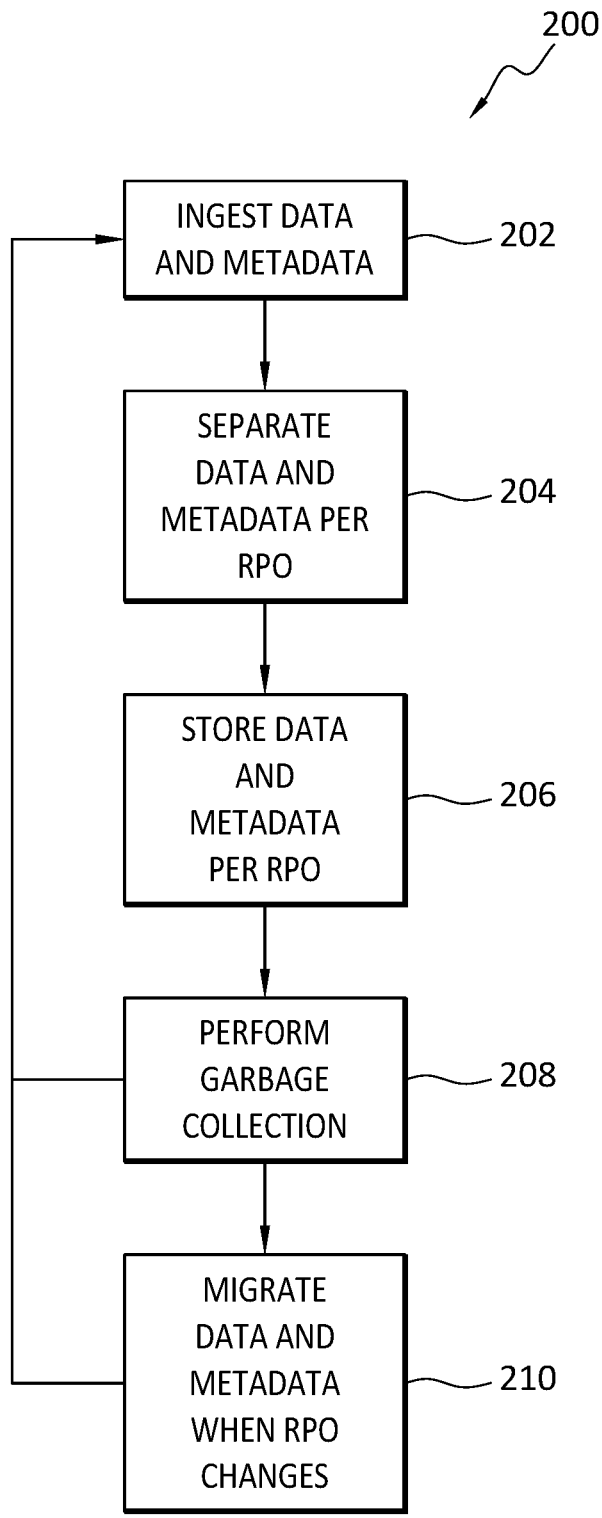
FIG. 2 discloses aspects of an example method according to some embodiments of the invention.

It is noted with respect to the example method of FIG. 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 2, aspects of an example method 200 are disclosed. The method 200 may be performed by a single entity, or cooperatively by a group of entities. Such entity or entities may include, but are not limited to, any one or more of assets, a backup software platform, a data storage platform, and one or more storage pools. The functional allocations between/among entities disclosed herein are provided only by way of example, and are not intended to limit the scope of the invention in any way.

The method 200 may begin when data and its associated metadata are ingested 202, such as by a data protection platform for example. Before, during, or after, ingestion 202, the data protection platform may be made aware, such as by backup software for example, of the respective RPOs of the data. That is, the data and its associated metadata may all have the same RPO, which may be different than an RPO of another set of data and its associated metadata.

The ingested data may then be separated 204, such as by the data protection platform for example, according to the respective RPO(s) of the ingested data. As a result, multiple groups of data (along with their respective metadata) may be defined, each group having its own respective associated RPO.

After the ingested data has been separated according to RPO 204, the different groups of data may then be stored 206 in storage pools, according to RPO. That is, for example, a group of data and associated metadata having a 15 minute RPO may be stored 206 in a 15 minute storage pool, or in a storage pool assigned an RPO that is acceptably close to the RPO of the group of data. The group of data and its metadata may, or may not, be segregated, in the 15 minute storage pool, from other groups of data/metadata in the 15 minute storage pool.

After the data/metadata have been stored 206, a garbage collection process may be performed 208 in the storage pool where the data/metadata were stored 206. The frequency of the garbage collection process may correspond to the RPO of the data that was stored 206, and may correspond to the RPO assigned to the storage pool. Thus, in a 15 minute storage pool, for example, garbage collection may be performed 208 every 15 minutes.

Note that the garbage collection may, or may not, be performed without reference to when the data was stored 206. For example, if a first set of data is stored 206 at T=5 minutes, but the next iteration of garbage collection, for other data already residing in the storage pool, is scheduled to commence 5 minutes later, the first instance of garbage collection for the data that was stored 206 at T=5 minutes, may be performed less than 15 minutes after that data was initially stored 206. Regardless of when the data is stored 206 however, some embodiments provide that, in no case, will the first garbage collection process be stored on that data longer than 15 minutes after that data was stored. Thus, for a set of newly stored data, the initial garbage collection for that newly stored data may be performed less than 1 minute after storage, but not more than 15 minutes after storage. As noted elsewhere herein however, it is not required that the GC cadence match the RPO, although lengthening the GC cadence may consume more storage, which may be acceptable within some specified range, so long as spare storage exists.

With continued reference to FIG. 2, a group of data/metadata may be migrated 210 from one storage pool to another storage pool, such as in response to an RPO change, which may be detected by the data storage platform, or which may be notified to the data storage platform, such as by backup software for example. The migration 210 may be based on the new RPO, and/or based on the respective RPO values assigned to one or more storage pools. In some embodiments, migration 210 may be performed to the closest lower, or closest higher, RPO storage pool. The migration 210 destination may depend on what other storage pools are available. In some cases, an RPO change may not result in a migration, such as if there is no storage pool available to better suit the RPO change than the storage pool where the data currently resides.

Finally, as shown in FIG. 2, garbage collection 208 and/or data migration 210 may be performed repeatedly, according to changing conditions, system configuration changes, and/or changes to RPOs.

E. Further Example Embodiments

Following are some further example embodiments of the invention. These are presented only by way of example and are not intended to limit the scope of the invention in any way.

Embodiment 1. A method, comprising: ingesting data to a data protection system; separating, by the data protection system, the ingested data into groups according to Recovery Point Objective (RPO) such that each group is associated with a different respective RPO; storing the groups in respective storage pools, and each of the storage pools is associated with a respective one of the RPOs; and performing a respective garbage collection (GC) process at each storage pool.

Embodiment 2. The method as recited in embodiment 1, wherein a frequency with which each GC process is performed is based on the RPO associated with the storage pool where the respective GC process is performed.

Embodiment 3. The method as recited in any of embodiments 1-2, wherein a frequency of performance of one of the GC processes is different from a frequency of performance of another of the GC processes.

Embodiment 4. The method as recited in any of embodiments 1-3, wherein the data protection system receives input that identifies the RPOs that apply to the ingested data.

Embodiment 5. The method as recited in any of embodiments 1-4, wherein each of the GC processes is performed only on data whose RPO has been matched with the RPO of the storage pool where that GC process is performed.

Embodiment 6. The method as recited in any of embodiments 1-5, further comprising migrating some of the data from the storage pool where that data is stored to another storage pool.

Embodiment 7. The method as recited in embodiment 6, wherein the storage pool and the another storage pool are associated with different respective RPOs.

Embodiment 8. The method as recited in embodiment 6, wherein the migrating is performed in response to a change in RPO of the data that is migrated.

Embodiment 9. The method as recited in any of embodiments 1-8, wherein metadata associated with the ingested data is ingested along with the data.

Embodiment 10. The method as recited in any of embodiments 1-9, wherein a frequency with which each GC process is performed is based on the RPO associated with the group of data with respect to which the respective GC process is performed.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
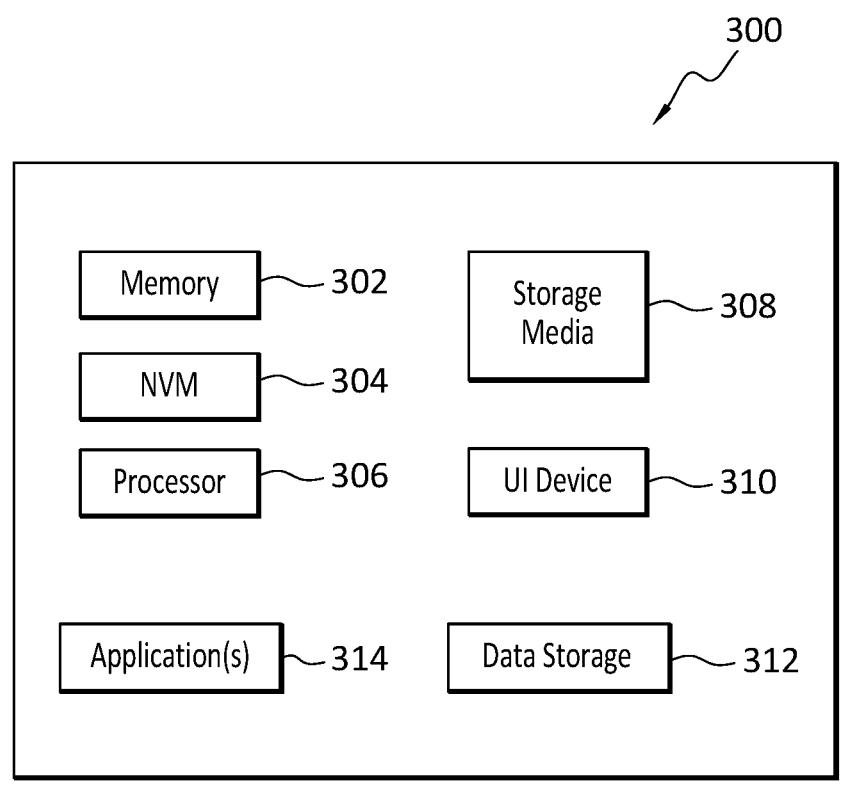
FIG. 3 discloses an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
ingesting, from each asset in a group of assets, respective data to a data protection system;
separating, by the data protection system, the ingested data into groups according to Recovery Point Objective (RPO) such that each group is associated with a different respective RPO;
storing, by the data protection system, the groups in respective storage pools of the data protection system, and each of the storage pools is associated with a respective one of the RPOs; and
performing, by the data protection system, a respective garbage collection (GC) process at each storage pool.

2. The method as recited in claim 1, wherein a frequency with which each GC process is performed is based on the RPO associated with the storage pool where the respective GC process is performed.

3. The method as recited in claim 1, wherein a frequency of performance of one of the GC processes is different from a frequency of performance of another of the GC processes.

4. The method as recited in claim 1, wherein the data protection system receives input that identifies the RPOs that apply to the ingested data.

5. The method as recited in claim 1, wherein each of the GC processes is performed only on data whose RPO has been matched with the RPO of the storage pool where that GC process is performed.

6. The method as recited in claim 1, further comprising migrating some of the data from the storage pool where that data is stored to another storage pool.

7. The method as recited in claim 6, wherein the storage pool and the another storage pool are associated with different respective RPOs.

8. The method as recited in claim 6, wherein the migrating is performed in response to a change in RPO of the data that is migrated.

9. The method as recited in claim 1, wherein metadata associated with the ingested data is ingested along with the data.

10. The method as recited in claim 1, wherein a frequency with which each GC process is performed is based on the RPO associated with the group of data with respect to which the respective GC process is performed.

11. A non-transitory storage medium having stored therein instructions that are executable by one or more hardware processors to perform operations comprising:
ingesting, from each asset in a group of assets, respective data to a data protection system;
separating, by the data protection system, the ingested data into groups according to Recovery Point Objective (RPO) such that each group is associated with a different respective RPO;
storing, by the data protection system, the groups in respective storage pools of the data protection system, and each of the storage pools is associated with a respective one of the RPOs; and
performing, by the data protection system, a respective garbage collection (GC) process at each storage pool.

12. A non-transitory storage medium as recited in claim 11, wherein a frequency with which each GC process is performed is based on the RPO associated with the storage pool where the respective GC process is performed.

13. A non-transitory storage medium as recited in claim 11, wherein a frequency of performance of one of the GC processes is different from a frequency of performance of another of the GC processes.

14. A non-transitory storage medium as recited in claim 11, wherein the data protection system receives input that identifies the RPOs that apply to the ingested data.

15. A non-transitory storage medium as recited in claim 11, wherein each of the GC processes is performed only on data whose RPO has been matched with the RPO of the storage pool where that GC process is performed.

16. A non-transitory storage medium as recited in claim 11, wherein the operations further comprise migrating some of the data from the storage pool where that data is stored to another storage pool.

17. A non-transitory storage medium as recited in claim 16, wherein the storage pool and the another storage pool are associated with different respective RPOs.

18. A non-transitory storage medium as recited in claim 16, wherein the migrating is performed in response to a change in RPO of the data that is migrated.

19. A non-transitory storage medium as recited in claim 11, wherein metadata associated with the ingested data is ingested along with the data.

20. A non-transitory storage medium as recited in claim 11, wherein a frequency with which each GC process is performed is based on the RPO associated with the group of data with respect to which the respective GC process is performed.

* * * * *